US012315477B2

(12) United States Patent
Navarrete

(10) Patent No.: US 12,315,477 B2
(45) Date of Patent: May 27, 2025

(54) STRING TOOL FOR REPLACING STRINGS ON INSTRUMENTS AND METHOD OF USING

(71) Applicant: Jorge Navarrete, Des Moines, IA (US)

(72) Inventor: Jorge Navarrete, Des Moines, IA (US)

( * ) Notice: Subject to any disclaimer, the term of this patent is extended or adjusted under 35 U.S.C. 154(b) by 392 days.

(21) Appl. No.: 18/062,742

(22) Filed: Dec. 7, 2022

(65) Prior Publication Data

US 2024/0194168 A1 Jun. 13, 2024

(51) Int. Cl.
*G10D 3/12* (2020.01)

(52) U.S. Cl.
CPC ...................................... *G10D 3/12* (2013.01)

(58) Field of Classification Search
CPC ............. G10D 3/12; G10D 3/153; G10D 3/00
See application file for complete search history.

(56) References Cited

U.S. PATENT DOCUMENTS 9,899,008 B1 2/2018 Williams
2006/0005687 A1 * 1/2006 Minakuchi ............. G10D 3/153 84/313
2007/0193430 A1 * 8/2007 Jang ......................... G10D 3/20 84/313

FOREIGN PATENT DOCUMENTS

JP 6030702 B2 * 11/2016 ............... G10D 3/12

OTHER PUBLICATIONS

About the Speedle, Guitar Speedle, LLC, https://www.guitarspeedle.com/about/, accessed Mar. 17, 2025.

* cited by examiner

*Primary Examiner* — Kimberly R Lockett
(74) *Attorney, Agent, or Firm* — Nyemaster Goode, P.C.

(57) ABSTRACT

A string tool configured to assist with removing old strings from musical instruments and replacing them with new strings. The string tool has a tool body with a first end and a second end. The tool body has a lumen therein extending from the first end to the second end, the lumen configured to receive a portion of an instrument's string. The tool body further comprising a first portion adjacent to the first end, the first portion having a first outer diameter, and a second portion adjacent to the second end, the second portion having a second outer diameter that is larger than the first outer diameter. The lumen may have a constant internal diameter along its entire length from the first end to the second end or the internal diameter of the lumen may be smaller in the first portion than in the second portion.

13 Claims, 6 Drawing Sheets

STRING TOOL FOR REPLACING STRINGS ON INSTRUMENTS AND METHOD OF USING

BACKGROUND

Stringed instruments, such as guitars, require one or more strings to be held in tension so that plucking the string vibrates it to produce the proper pitch. A string has a first end secured to one part of the instrument and a second end secured to another part of the instrument. A retention member such as a knot or ball is integrally combined with the second end of the string. In most stringed instruments, the first end of the string is threaded through a channel of a string anchor. The string anchor may be a bridge, such as a tremolo bridge, a tailpiece or stop bar, the body of the instrument, or any other component configured to secure the second end of the string at one end of the instrument's neck. The channel has a diameter smaller than the diameter of the retention member so the retention member is prevented from passing through the channel as the first end of the string is tightened around a tuning peg causing tension in the string.

One problem with stringed instruments is the difficulty associated with replacing old strings with new strings. The retention member of the old string can become lodged or stuck in the channel of the string anchor since tension on the string pulls the retention member toward/into the channel. Further, the first end of the string can have a very small diameter making it difficult to thread through the anchor's channel. Still further, sometimes an anchor channel has differing internal diameters such that the first end of the string can encounter surfaces inside the channel (such as when the internal diameter of the channel goes from a larger diameter to smaller diameter) making it difficult to insert the new string through the channel. Still further, sometimes an electromagnetic charge is created along the channel by the guitar's amplifier or by static electricity. The charge attracts the new string toward the wall of the channel making it difficult to pass the string through the channel.

There is therefore a need for a tool for removing old strings and threading new strings onto a stringed instrument which overcomes these and other problems.

SUMMARY

One aspect of the invention relates to a string tool having a tool body with a first end and a second end. The tool body having a lumen therein extending from the first end to the second end. The string tool further comprising a first portion adjacent to the first end, the first portion having a first outer diameter, and a second portion adjacent to the second end, the second portion having a second outer diameter that is larger than the first outer diameter. In some embodiments the lumen has a constant internal diameter along its entire length from the first end to the second end. In other embodiments the first portion has an internal diameter that is smaller than an internal diameter of the second portion.

Another aspect of the invention relates to a string tool having a tool body with a first end and a second end. The tool body having a lumen therein extending from the first end to the second end. The string tool further comprising a first portion adjacent to the first end, the first portion having a first outer diameter, and a second portion adjacent to the second end, the second portion having a second outer diameter that is larger than the first outer diameter. In some embodiments the lumen has a constant internal diameter along its entire length from the first end to the second end.

In other embodiments the first portion has an internal diameter that is smaller than an internal diameter of the second portion. The string tool is configured to assist with replacing a string on an instrument having a string anchor with a channel therein. The new string has a first end and a second end, wherein the second end is combined with a retention member such as a knot or ball. The one or more internal diameter(s) of the lumen is larger than a diameter of the string but smaller than a diameter of the retention member combined with a second end of the string so that the string can pass through the lumen of the string tool but the retention member cannot pass through the lumen. The outer diameter of the first portion of the string tool is smaller than a diameter of the channel of the string anchor so that the first portion can pass through the channel to dislodge a string retention member which has become lodged in the channel. The outer diameter of the second portion of the string tool is larger than the diameter of the channel in the string anchor to prevent it from passing through the channel.

Another aspect of the invention relates to a method of making the string tool described in the previous paragraphs. The string tool comprises a first portion and a second portion, each portion having a lumen extending therethrough. The first portion has an outer diameter and the lumen of the second portion has an inner diameter. The outer diameter of the first portion approximates (or is slightly larger than) the inner diameter of the lumen of the second portion. The method includes positioning the first portion within the lumen of the second portion to secure the two portions together using a friction fit.

Another aspect of the invention relates to a method of using the string tool described in the previous paragraphs. The method includes taking a stringed instrument having a string anchor with a channel therein and an old string combined with the instrument and passing through the channel of the string anchor. Inserting the first portion of the string tool into the channel in the string anchor to dislodge the retention member of the old string from the channel. Once the old string is removed, positioning the first portion of the string tool in the channel so the first portion extends from one side of the channel and the second portion extends from the other side of the channel. Threading the first end of a new string through the lumen of the string tool (starting at the first end) until the string emerges from the second end of the string tool. Removing the strong tool from the new string and securing the first end of the string to the turning pegs at the distal end of the instrument's neck.

DETAILED DESCRIPTION

Figure 1:
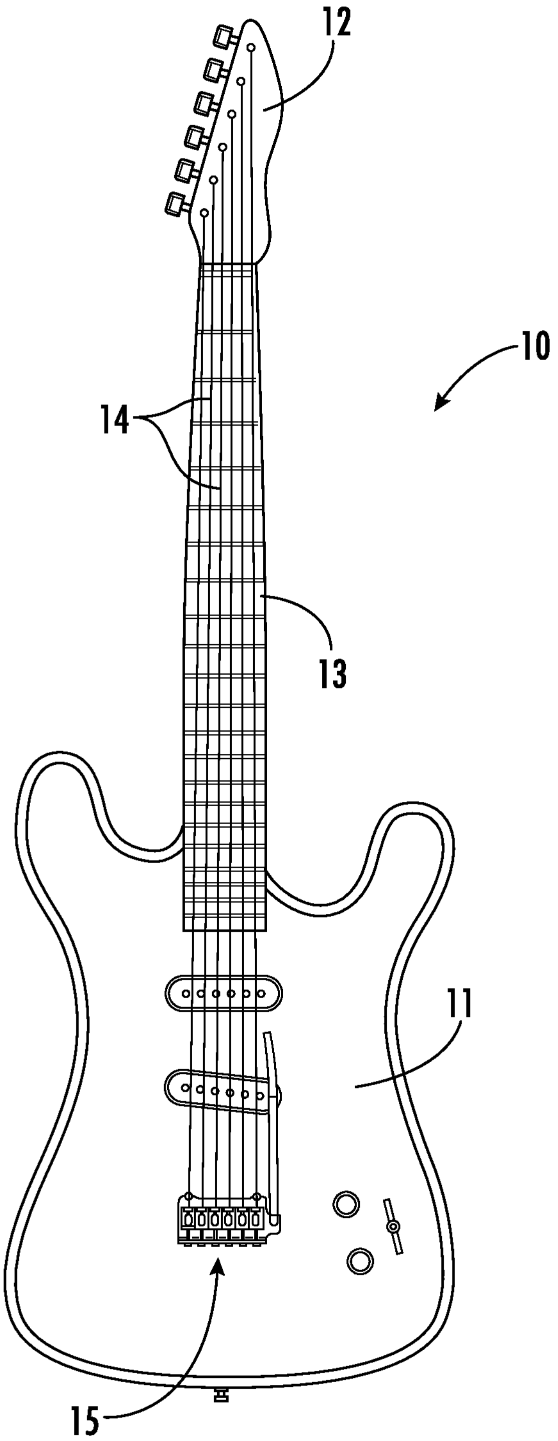
FIG. 1 is a top view of an embodiment of a stringed instrument having a string anchor.

One embodiment of the present disclosure relates to an instrument string tool 18 having a tool body configured to be used with a stringed instrument 10. An exemplary stringed instrument 10 is shown in FIG. 1 wherein the stringed instrument 10 may include a main body 11, a neck 13 extending from main body 11, and one or more strings 14 combined with the instrument 10 extending across the neck 13. A first end of each string 14 is connected to the head 12 by tuning pegs or other suitable means. The second end of each string 14 extends toward main body 11 and is connected to main body 11 or some component attached to main body 11, such as a string anchor 15. The second end of each string 14 is combined with a retention member 16 such as a knot or ball. The string anchor 15 may be a bridge, such as a tremolo bridge, a tailpiece or stop bar, the body of the instrument 10, or any other component configured to secure the second end of the string 14 at one end of the instrument's neck 13.

Figure 2:
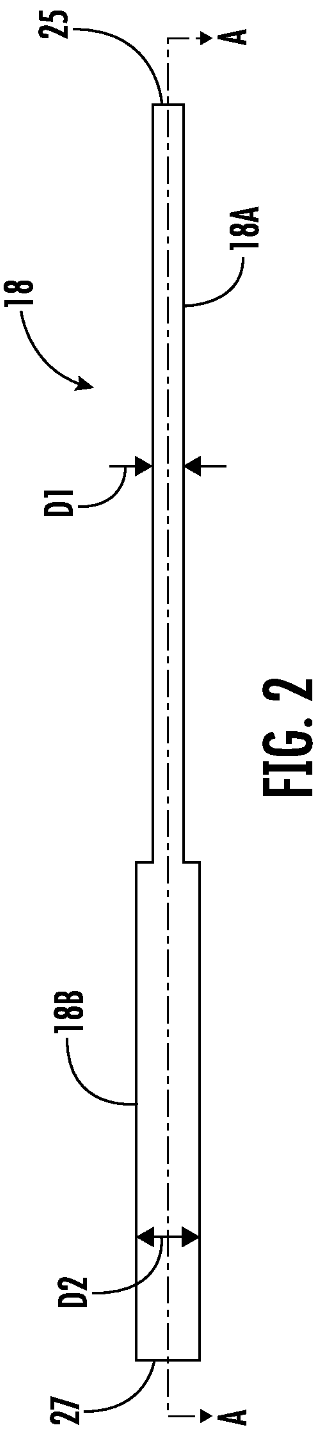
FIG. 2 is a side view of the string tool.
Figure 3A:
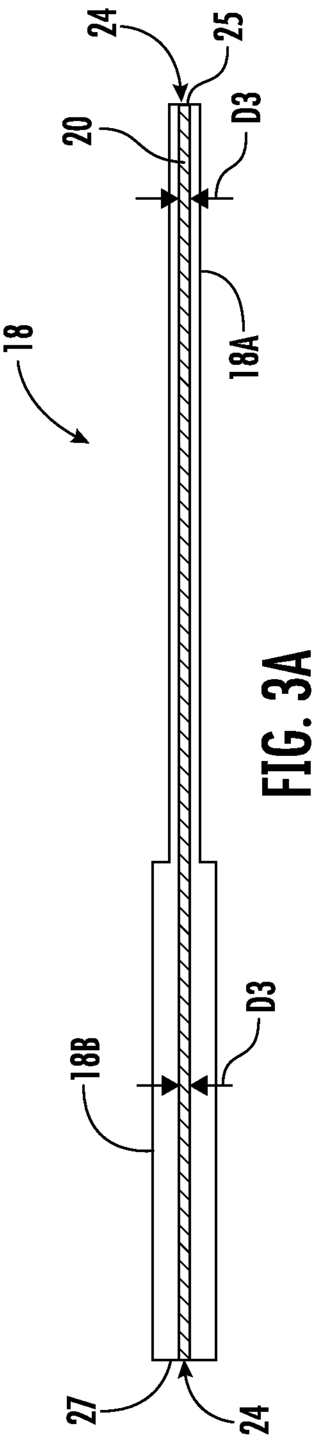
FIG. 3A is a section view of the string tool taking along line A-A and showing the lumen through the length of the tool having a constant internal diameter.
Figure 3B:
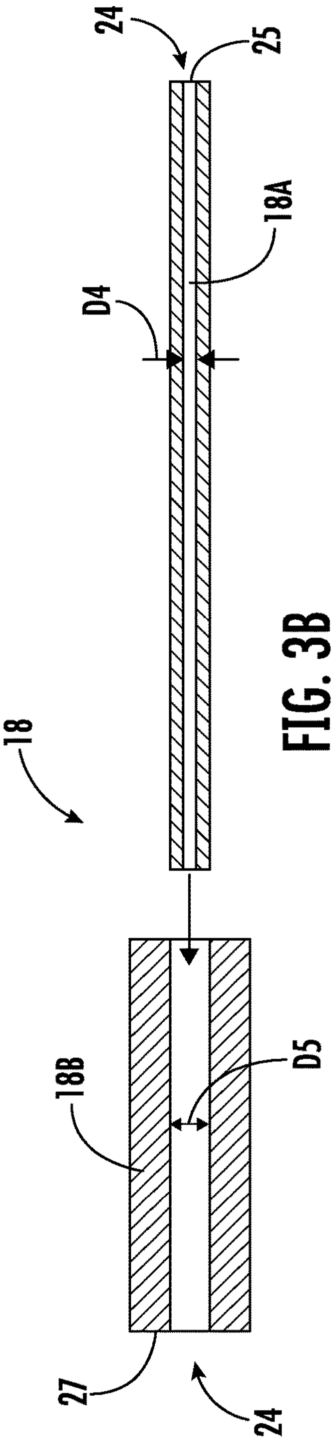
FIG. 3B is a section view of an embodiment showing the first portion separate from the second portion before the two portions are combined together.
Figure 3C:
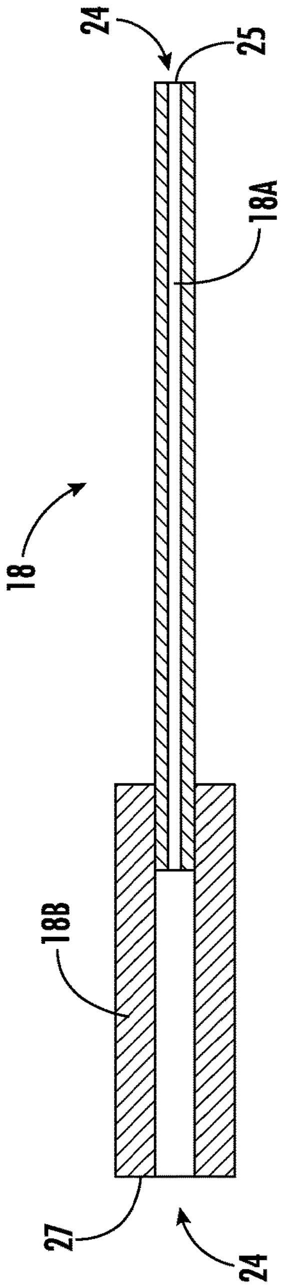
FIG. 3C is a section view of the string tool shown in FIG. 3B showing the first portion combined with the second portion and the lumen through the length of the tool having a first diameter larger than a second diameter.
Figure 4:
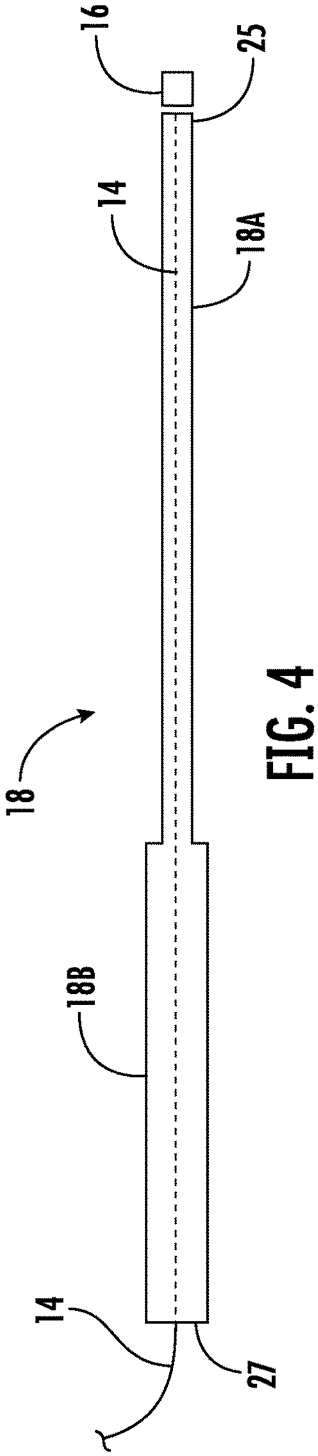
FIG. 4 is a side view of the string tool similar to FIG. 2 showing an instrument string passing through the lumen of the tool.

FIGS. 2-4 show an embodiment of the string tool 18. The string tool 18 generally includes a tool body having first end 25 and a second end 27. The tool body includes a first portion 18A adjacent to the first end 25, the first portion 18A having a first outer diameter D1, and a second portion 18B adjacent to the second end 27, the second portion 18B having a second outer diameter D2 that is larger than the first outer diameter D1.

FIG. 3A shows a section view takin along line A-A in FIG. 2. FIG. 3A shows a lumen 24 extending from the first end 25 to the second end 27 wherein the lumen 24 has a constant internal diameter D3 along its entire length from the first end 25 to the second end 27. The constant internal diameter D3 and the smooth inner walls of the lumen 24 allow a thin string 14 to be easily threaded through the string tool 18. As shown in FIG. 3B, in other embodiments the lumen 24 has a first diameter D4 and a second diameter D5 different from the first diameter D4. In these embodiments the smaller first diameter D4 may extend along the length of the first portion 18A and the larger second diameter D5 may extend along the length of the second portion 18B. Regardless of the embodiment, the internal diameter of the lumen 24 is larger than a diameter of a string 14 but smaller than a diameter of a retention member 16 combined with a second end of the string 14 so that the string 14 can pass through the lumen 24 of the string tool 18 but the retention member 16 cannot pass through the lumen 24. FIG. 4 shows a string tool 18 having a string 14 threaded through the lumen 24 wherein the retention member 16 is larger than the diameter of the lumen 24.

In some embodiments specific to use on guitars, the outer diameter D1 of the first portion 18A of the tool 18 is about 2.5 mm (0.0984 inches) and the outer diameter D2 of the second portion 18B of the tool 18 is about 5.943 mm (0.234 inches). This allows the first portion 18A to pass through the channel 22 of a tremolo bridge or other string anchor 15 but not the second portion 18B. The internal diameter of the lumen 24 at the first diameter D4 is about 2.0 mm (0.07874 inches) and the internal diameter of the lumen 24 at the second diameter D5 is about 2.4765 mm (0.0975 inches). This is large enough to allow some of the thickest guitar strings to pass through since guitar strings are typically never thicker than 1.9302 mm (0.076 inches). In some embodiments the length of the first portion 18A is about 76.2 mm (3 inches) and the length of the second portion 18B is about 50.8 mm (2 inches). In some embodiments the length of the first portion 18A is about 127 mm (5 inches) and the length of the second portion 18B is about 50.8 mm (2 inches), however, some of the first portion 18A is positioned within the second portion 18B as described below with respect to FIGS. 3B and 3C.

As shown in FIGS. 3B and 3C, in some embodiments the outer diameter of the first portion 18A approximates (or is slightly larger than) the second diameter D5 of the lumen 24 of the second portion 18B. This allows the first portion 18A and the second portion 18B to be secured together by a friction fit wherein the first portion 18A is positioned inside the lumen of the second portion 18B. In some embodiments the outer diameter of the first portion 18A is about 2.5 mm (0.0984 inches) and the internal diameter of the second portion 18B is about 2.4765 mm (0.0975 inches). FIG. 3B shows the two portions 18A, 18B before the first portion 18A is inserted into the lumen of the second portion 18B in the direction of the arrow. FIG. 3C shows the two portions 18A, 18B secured together with a length of the first portion 18A positioned inside of the second portion 18B. In some embodiments a lubricant is used to help reduce friction as the first portion 18A is inserted into the lumen of the second portion 18B.

The outer diameter of the first portion of the string tool 18 is smaller than a diameter of a channel 22 of a string anchor 15 so that the first portion 18A can pass through the channel 22 to dislodge string retention members 16 which have become lodged in the channel, but the second portion 18B cannot pass through the channel 22 in the string anchor 15. The outer diameter of the second portion of the string tool 18 is larger than the diameter of the channel in the string anchor 15 to prevent it from passing through the channel 22.

Figure 5A:
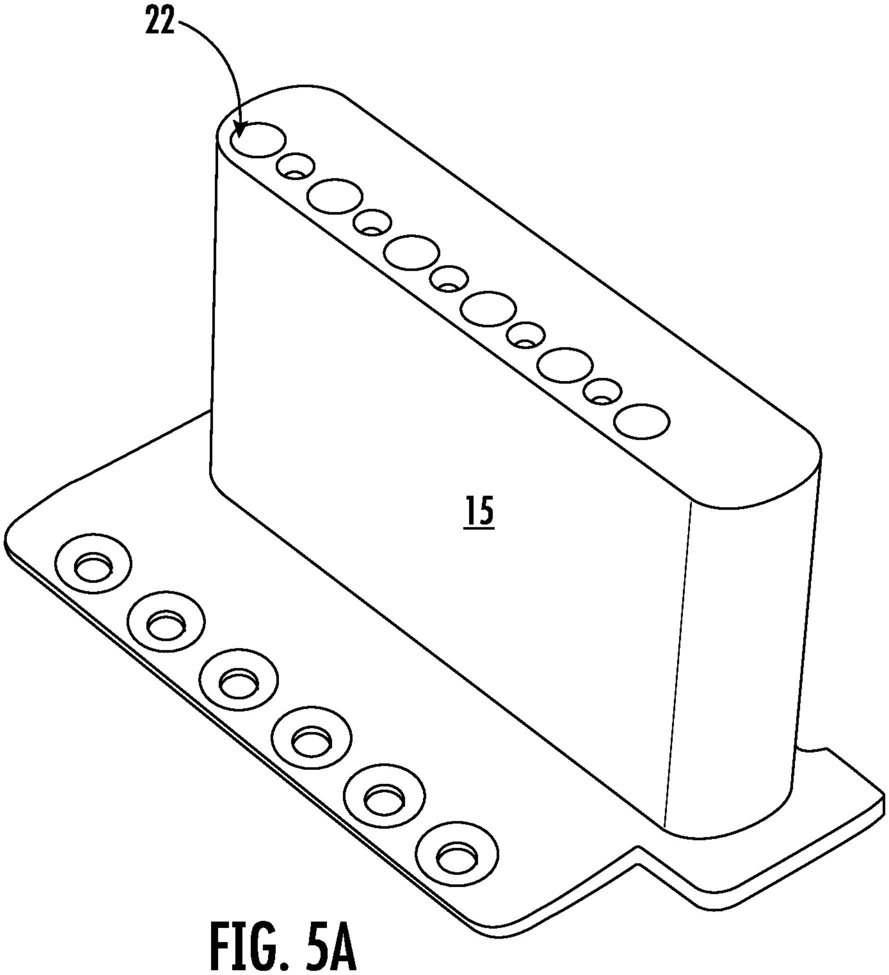
FIG. 5A shows an instrument bridge having channels therein configured to receive instrument strings.
Figure 5B:
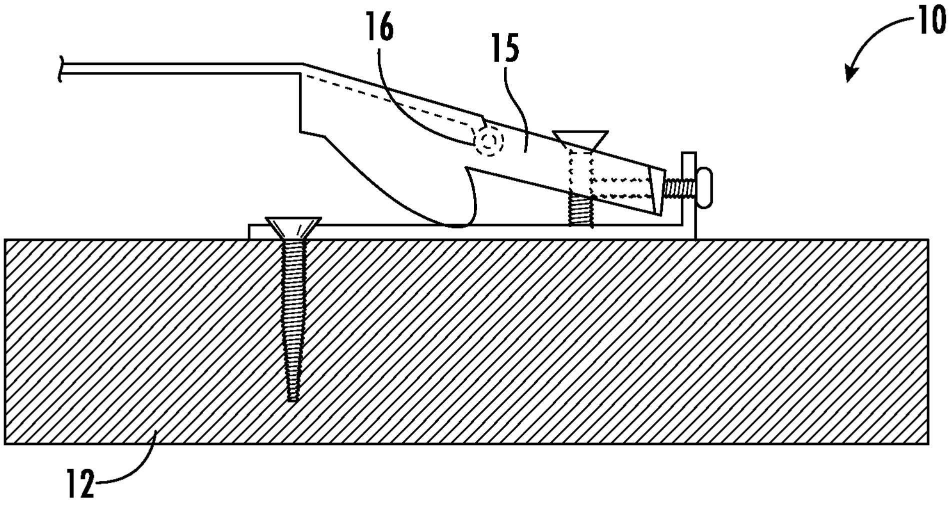
FIG. 5B is a side section view of an instrument bridge showing a string passing tough the channel in the bridge.

As shown in FIGS. 5A and 5B, in some embodiments, the anchor 15 may be a bridge, such as a tremolo bridge. The anchor 15 has a channel 22 therein configured to receive a portion of the string 14. The string 14 has a retainer member 16 at its second end to prevent the string 14 from being pulled through the channel 22. The other (first) end of the string 14 can be anchored to the head 12 of the stringed instrument 10 as shown in FIG. 1 such that tension can be produced in string 14. A string 14 having a string retainer 16, such as a ball or other knot in the string 14, can be inserted through the integrated string channel 22 and the string retainer 16 can engage a periphery of the channel 22 when the string is tensioned to secure the string 14 to the instrument 10.

Figure 6A:
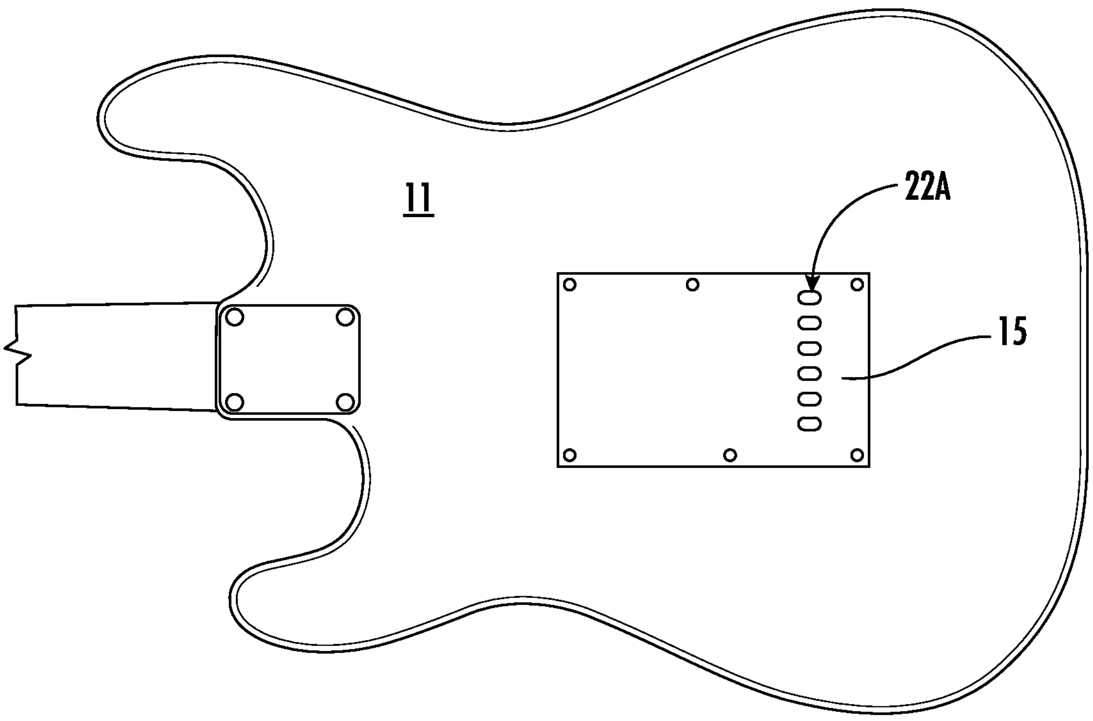
FIG. 6A is a bottom view of a stringed instrument showing channels therein configured to receive instrument strings.
Figure 6B:
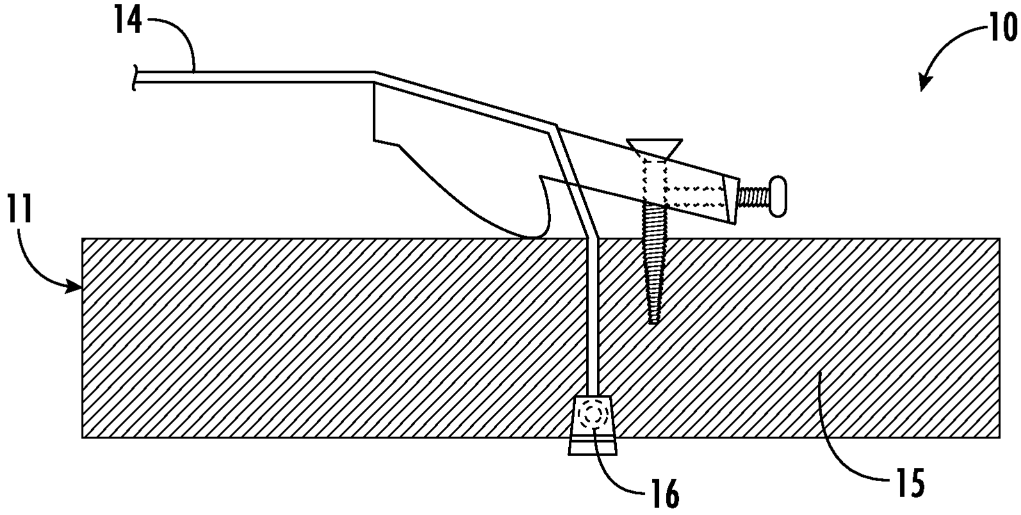
FIG. 6B is a side section view of a string passing through the channel of the instrument shown in FIG. 6A.

As shown in FIGS. 6A and 6B, in some embodiments, integrated string anchor 15 is a portion of the instrument body 11. For example, as shown, some electric guitars have a channel 22A from the top side to the bottom side configured to receive the string 14. A string 14 having a string retainer 16, such as a ball or other knot in the string 14, can be inserted through the integrated string channel 22A, from the bottom side of the instrument body 11, through the channel 22A, and out the top side of the instrument body 11. The string retainer 16 can engage a periphery of the channel 22A when the string 14 is tensioned to secure the string 14 to the anchor 15.

Figure 7:
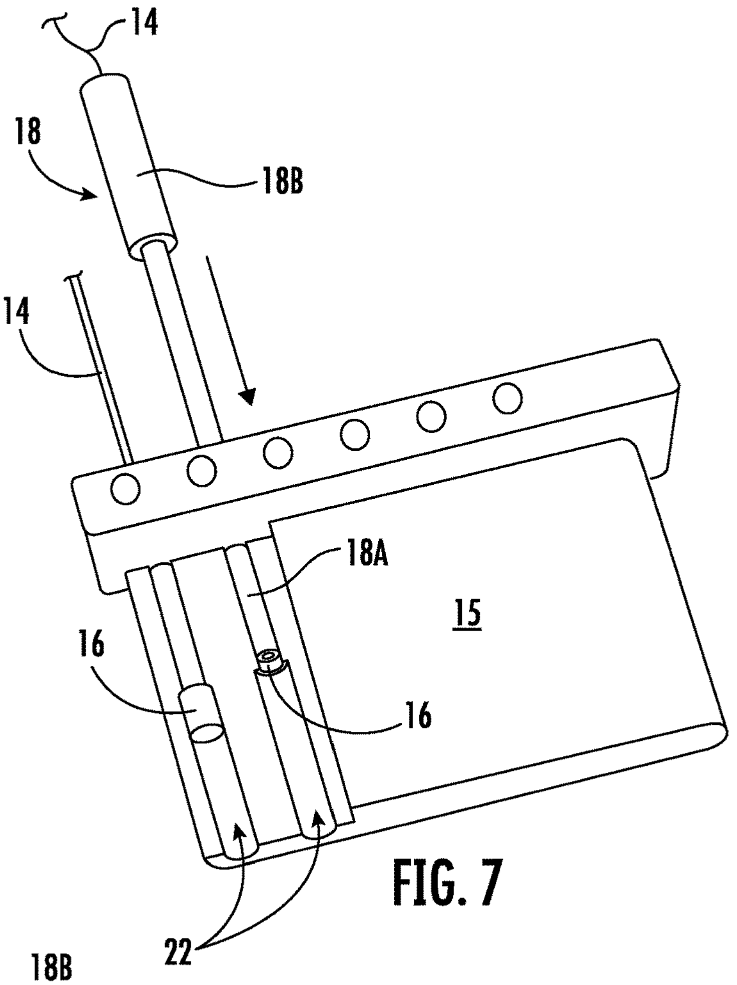
FIG. 7 is a perspective view of a bridge wherein a portion of the bridge has been removed to show the string tool being used to dislodge a ball end of the string from the channel.
Figure 8:
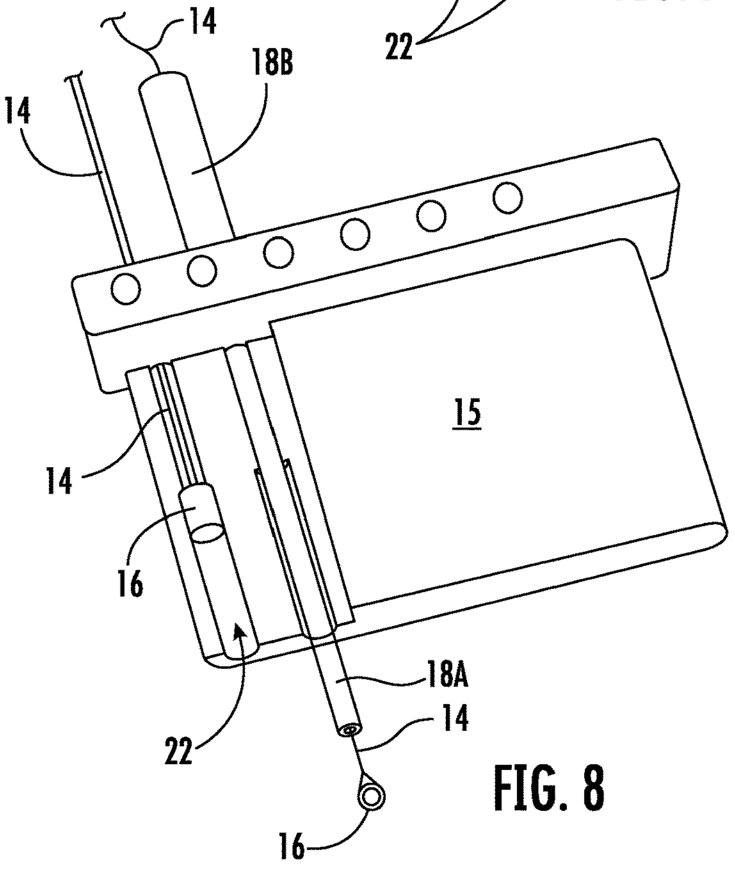
FIG. 8 is a perspective view of a bridge wherein a portion of the bridge has been removed to show the string tool positioned therein to assist with stringing a new string.

FIGS. 7 and 8 help illustrate the method of using the string tool 18. As shown in FIG. 7, the retainer member 16 of the old string 14 is stuck in the channel 22 at a point where the channel 22 transitions from a larger diameter to a smaller diameter. The first portion 18A of the sting tool 18 is inserted into the channel 22 to help dislodge the retainer member 16. In some cases, it may be necessary to thread the old string 14 through the string tool 18 so the string 14 is passing through the sting tool 18 when the string tool 18 is inserted into the channel 22. Depending on the thickness of the string 14, the channel 22 may not have a large enough diameter to accommodate the old string 14 and the string tool 18. FIG. 8 helps illustrate the method of using the string tool 18 to thread a new string 14 through the anchor 15. Once the old string 14 is removed, positioning the first portion 18A of the string tool 18 in the channel 22 so that the first portion 18A extends from one side of the channel 22 and the second portion 18B extends from the other side of the channel 22. The first end of the new string 14 is threaded through the lumen 24 of the string tool 18 (starting at the first end) until the string 14 emerges from the second end of the string tool 18. In embodiments having a constant internal lumen diameter D3, the constant diameter D3 and smooth inner surface of the lumen 24 help the string 14 easily pass through the tool 18. In embodiments having multiple lumen diameters D4, D5, the string 14 is inserted into the first portion 18A of tool 18 having the narrower diameter D4. Thus, the string 14 does not encounter any lumen walls because the diameter of the lumen only increases from the first portion 18A to the second portion 18B (See FIGS. 3B and 3C). As shown in FIGS. 7 and 8, this is the opposite of a typical anchor 15 since the channel 22 typically must get narrower to secure the retention member 16 inside the anchor 15. The string tool 18 is then pulled off of the string 14 so the first end of the new string 14 can be secured to the head 12/turning pegs at the distal end of the neck 13.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. A string tool configured to assist with replacing a string on an instrument having a string anchor with a channel therein, said string tool comprising:

a tool body having a first end and a second end;

a lumen extending from the first end to the second end;

a first portion having a first outer diameter;

a second portion having a second outer diameter that is larger than the first outer diameter;

wherein the lumen has a first internal diameter along the first portion and a second internal diameter along the second portion, wherein the first internal diameter is smaller than the second internal diameter.

2. The tool of claim 1 wherein the first portion is adjacent to the first end.

3. The tool of claim 1 wherein the second portion is adjacent to the second end.

4. The tool of claim 1 wherein the lumen has an internal diameter that is generally constant from the first end to the second end.

5. The tool of claim 1 wherein first outer diameter approximates the second internal diameter such that the first portion is configured to be received within the second portion.

6. The tool of claim 1 wherein the first outer diameter is about 2.5 mm (0.0984 inches) and the second outer diameter is about 5.943 mm (0.234 inches).

7. The tool of claim 3 wherein the first inner diameter is about 2.0 mm (0.07874 inches) and the second inner diameter is about 2.4765 mm (0.0975 inches).

8. The tool of claim 1 wherein the first portion has a first length of about 76.2 mm (3 inches) and the second portion has a second length of about 50.8 mm (2 inches).

9. The tool of claim 1 wherein the string anchor is a tremolo bridge.

10. The tool of claim 1 wherein the stringed instrument has a body and the string anchor is a portion of the body.

11. A method of restringing a stringed instrument using a string tool, said method comprising:

taking the stringed instrument, wherein the stringed instrument has a tuning peg, a string anchor with a channel therein, and an old string passing through the channel of the sting anchor;

taking the string tool, wherein the string tool has a tool body with a lumen therein extending from a first end to a second end, the string tool comprising a first portion having a first outer diameter and a second portion having a second outer diameter that is larger than the first outer diameter;

inserting the first portion of the string tool into the channel in the string anchor to dislodge the retention member of the old string from the channel;

positioning the first portion of the string tool in the channel so the first portion extends from one side of the channel and the second portion extends from the other side of the channel;

taking a new string having a first end and a second end and threading the first end of the new string through the first end of the string tool until the new string emerges from the second end of the string tool; and removing the strong tool from the new string and securing the first end of the new string to the turning pegs.

12. The tool of claim 11 wherein the string anchor is a tremolo bridge.

13. The tool of claim 11 wherein the stringed instrument has a body and the string anchor is a portion of the body.

* * * * *